(12) United States Patent
Williams

(10) Patent No.: US 10,717,103 B2
(45) Date of Patent: Jul. 21, 2020

(54) INFLATABLE BOOTH SYSTEM AND METHOD FOR APPLYING A SPRAY-ON BED-LINER TO A TRUCK BED

(71) Applicant: Thomas Williams, Montgomery, TX (US)

(72) Inventor: Thomas Williams, Montgomery, TX (US)

(*) Notice: Subject to any disclaimer, the term of this patent is extended or adjusted under 35 U.S.C. 154(b) by 0 days.

(21) Appl. No.: 14/328,689

(22) Filed: Jul. 10, 2014

(65) Prior Publication Data
US 2015/0040487 A1 Feb. 12, 2015

Related U.S. Application Data

(60) Provisional application No. 61/852,226, filed on Jul. 10, 2013.

(51) Int. Cl.
| | | |
|---|---|---|
| B05B 16/40 | (2018.01) | |
| B05B 16/60 | (2018.01) | |
| B05B 16/80 | (2018.01) | |
| B05D 5/00 | (2006.01) | |
| E04H 1/12 | (2006.01) | |
| E04H 5/02 | (2006.01) | |
| E04H 15/20 | (2006.01) | |
| B60R 13/01 | (2006.01) | |

(52) U.S. Cl.
CPC ............ *B05B 16/40* (2018.02); *B05B 16/60* (2018.02); *B05B 16/80* (2018.02); *B05D 5/00* (2013.01); *E04H 1/1205* (2013.01); *E04H 5/02* (2013.01); *E04H 15/20* (2013.01); *B60R 13/01* (2013.01); *E04H 2015/201* (2013.01)

(58) Field of Classification Search
CPC ......... E04H 1/1205; E04H 5/02; E04H 15/20; E04H 2015/201; B05B 16/40; B05B 16/405; B05B 16/60; B05B 16/80
USPC ............ 52/2.13, 2.14, 2.17, 2.22, 2.23, 2.24
See application file for complete search history.

(56) References Cited

U.S. PATENT DOCUMENTS

| | | | | |
|---|---|---|---|---|
| 1,828,609 A | * | 10/1931 | Mahon ................... | B05B 16/20 454/51 |
| 2,230,646 A | * | 2/1941 | Klausmeyer ........ | B05B 15/1222 118/DIG. 7 |
| 2,463,090 A | * | 3/1949 | Dixon .................... | A61G 10/04 62/261 |
| 2,498,339 A | * | 2/1950 | Miskella .................. | F26B 3/30 118/642 |
| 2,910,994 A | * | 11/1959 | Joy ......................... | E04H 15/22 52/2.11 |
| 3,006,339 A | * | 10/1961 | Smith .................... | A61G 10/04 128/204.22 |
| 3,145,719 A | * | 8/1964 | Johnson .................. | E04H 15/20 52/2.21 |

(Continued)

*Primary Examiner* — Patrick J Maestri
*Assistant Examiner* — Joseph J. Sadlon
(74) *Attorney, Agent, or Firm* — Bushman Werner, P.C.

(57) ABSTRACT

An improved system and method for applying a spray-on bed-liner to a truck bed is herein disclosed. An inflatable bed-liner booth can comprise an inflatable frame, a roof, a floor, a plurality of wall sections, one or more air inlets, a plurality of air vents, an entry port, and one or more exhaust panels. The inflatable frame can comprise a plurality of vertical supports. The roof at the top of the inflatable frame. The floor at the bottom of the inflatable frame. The wall sections can be defined by at least one of the inflatable frame, the roof, and the floor.

20 Claims, 17 Drawing Sheets

(56) References Cited

U.S. PATENT DOCUMENTS

| | | | | |
|---|---|---|---|---|
| 3,161,553 A | * | 12/1964 | Visser | B29C 70/10 156/156 |
| 3,170,384 A | * | 2/1965 | Evert | B05B 14/46 454/54 |
| 3,255,690 A | * | 6/1966 | Schack | A23L 3/06 99/356 |
| 3,338,001 A | * | 8/1967 | Fraser | E04H 15/20 52/2.21 |
| 3,727,345 A | * | 4/1973 | Smith | A01G 13/06 47/2 |
| 3,791,076 A | * | 2/1974 | Gahler | A01G 9/1415 52/2.17 |
| 3,936,984 A | * | 2/1976 | Yando | E04H 15/20 52/2.19 |
| 4,114,325 A | * | 9/1978 | Hochstein | E04H 15/20 52/2.21 |
| 4,186,530 A | * | 2/1980 | Fraioli | E04H 15/20 52/2.19 |
| 4,297,813 A | * | 11/1981 | Farrell | A01G 9/225 52/2.17 |
| 4,332,112 A | * | 6/1982 | Hsu | E04H 15/20 52/2.21 |
| 4,616,594 A | * | 10/1986 | Itho | B05B 16/95 118/326 |
| 4,625,633 A | * | 12/1986 | Martin | A47B 83/001 454/49 |
| 4,662,309 A | * | 5/1987 | Mulder | B05B 16/95 118/312 |
| 4,736,762 A | * | 4/1988 | Wayman | A61G 10/005 128/205.26 |
| 4,750,412 A | * | 6/1988 | Itou | B05B 16/95 454/52 |
| 4,769,962 A | * | 9/1988 | Pohl | E04B 1/34326 135/160 |
| 4,819,389 A | * | 4/1989 | Kihn | E04H 15/20 135/97 |
| 4,887,627 A | * | 12/1989 | Audet | E04H 15/64 135/120.1 |
| 4,913,873 A | * | 4/1990 | Robbins, III | B29C 51/162 156/287 |
| 4,932,354 A | * | 6/1990 | Kistner | B05B 16/80 118/305 |
| 4,944,321 A | * | 7/1990 | Moyet-Ortiz | B60J 11/00 135/148 |
| 5,042,420 A | * | 8/1991 | Gerdes | B05B 15/1214 118/326 |
| 5,070,667 A | * | 12/1991 | Schulte | E04B 1/34321 52/241 |
| 5,122,400 A | * | 6/1992 | Stewart | 428/34.7 |
| 5,173,118 A | * | 12/1992 | Josefsson | B05B 15/1222 118/309 |
| 5,184,436 A | * | 2/1993 | Sadler | E04B 1/34321 446/478 |
| 5,259,879 A | * | 11/1993 | Khattab | B05B 16/40 118/309 |
| 5,293,652 A | * | 3/1994 | Furr | E04H 4/105 4/498 |
| 5,331,991 A | * | 7/1994 | Nilsson | 135/93 |
| 5,380,243 A | * | 1/1995 | Josefsson | B05B 14/468 454/52 |
| 5,456,023 A | * | 10/1995 | Farnan | F26B 9/06 239/71 |
| 5,502,927 A | * | 4/1996 | Hammerton | 52/218 |
| 5,546,722 A | * | 8/1996 | Huang | E04B 7/02 52/2.17 |
| 5,570,544 A | * | 11/1996 | Hale et al. | 52/2.18 |
| 5,706,846 A | * | 1/1998 | Sutton | 52/2.17 |
| 5,762,548 A | * | 6/1998 | Milojevic | B05B 16/60 454/52 |
| 5,772,535 A | * | 6/1998 | Murphy | A63B 5/11 273/349 |
| 5,864,991 A | * | 2/1999 | Burns | B60P 3/14 52/67 |
| 5,913,775 A | * | 6/1999 | Delamare | E04H 15/20 52/2.11 |
| 5,950,503 A | * | 9/1999 | Amendolea | B23P 21/006 74/813 R |
| 6,001,057 A | * | 12/1999 | Bongiovanni | A61G 1/04 5/629 |
| 6,119,408 A | * | 9/2000 | Page | E04H 15/22 52/2.17 |
| 6,226,568 B1 | * | 5/2001 | Tong | B05B 16/20 700/277 |
| 6,289,909 B1 | * | 9/2001 | Wood | E04H 15/36 135/123 |
| 6,484,459 B1 | * | 11/2002 | Platts | E04H 9/14 52/219 |
| 6,606,826 B2 | * | 8/2003 | Nagle | E04H 15/20 135/87 |
| 6,810,896 B2 | * | 11/2004 | Ueda | E04H 15/20 135/124 |
| 6,875,119 B2 | * | 4/2005 | Murphy | E04H 15/22 472/134 |
| 7,001,262 B2 | * | 2/2006 | Tong | B05B 16/60 454/52 |
| 7,316,749 B2 | * | 1/2008 | Smith | E04B 1/08 118/326 |
| 7,867,569 B2 | * | 1/2011 | Hazan | B05D 7/14 427/372.2 |
| 8,001,987 B2 | * | 8/2011 | Williams | E04H 15/06 135/125 |
| 8,079,182 B1 | * | 12/2011 | Higgins | E04H 7/24 52/2.11 |
| 8,479,452 B2 | * | 7/2013 | Page | 52/2.23 |
| 8,549,794 B2 | * | 10/2013 | Hotes | E04H 15/16 135/156 |
| 8,597,263 B2 | * | 12/2013 | Hipperson | A01K 13/001 604/289 |
| 8,646,404 B2 | * | 2/2014 | Hendricks, Sr. | B29D 30/0061 118/503 |
| 8,826,565 B2 | * | 9/2014 | Hahn | F26B 21/12 118/326 |
| 8,973,335 B2 | * | 3/2015 | Wilson | E04B 1/34315 52/745.02 |
| 9,217,576 B2 | * | 12/2015 | Ikeno | F24F 3/161 |
| 9,253,990 B1 | * | 2/2016 | Barraco | A22C 11/06 |
| 9,386,784 B2 | * | 7/2016 | Colmerauer | A23L 5/00 |
| 9,776,223 B2 | * | 10/2017 | Rankin | B05B 16/60 |
| 2002/0185064 A1 | * | 12/2002 | Shutic | B05B 16/25 118/309 |
| 2004/0050411 A1 | * | 3/2004 | Lawrence | E04H 15/20 135/128 |
| 2007/0095279 A1 | * | 5/2007 | Langeman | B05B 15/1214 118/326 |
| 2008/0223296 A1 | * | 9/2008 | Giardini | B05B 13/0473 118/620 |
| 2010/0272915 A1 | * | 10/2010 | Laws | 427/421.1 |
| 2013/0068851 A1 | * | 3/2013 | Young | A61M 35/00 239/8 |

* cited by examiner

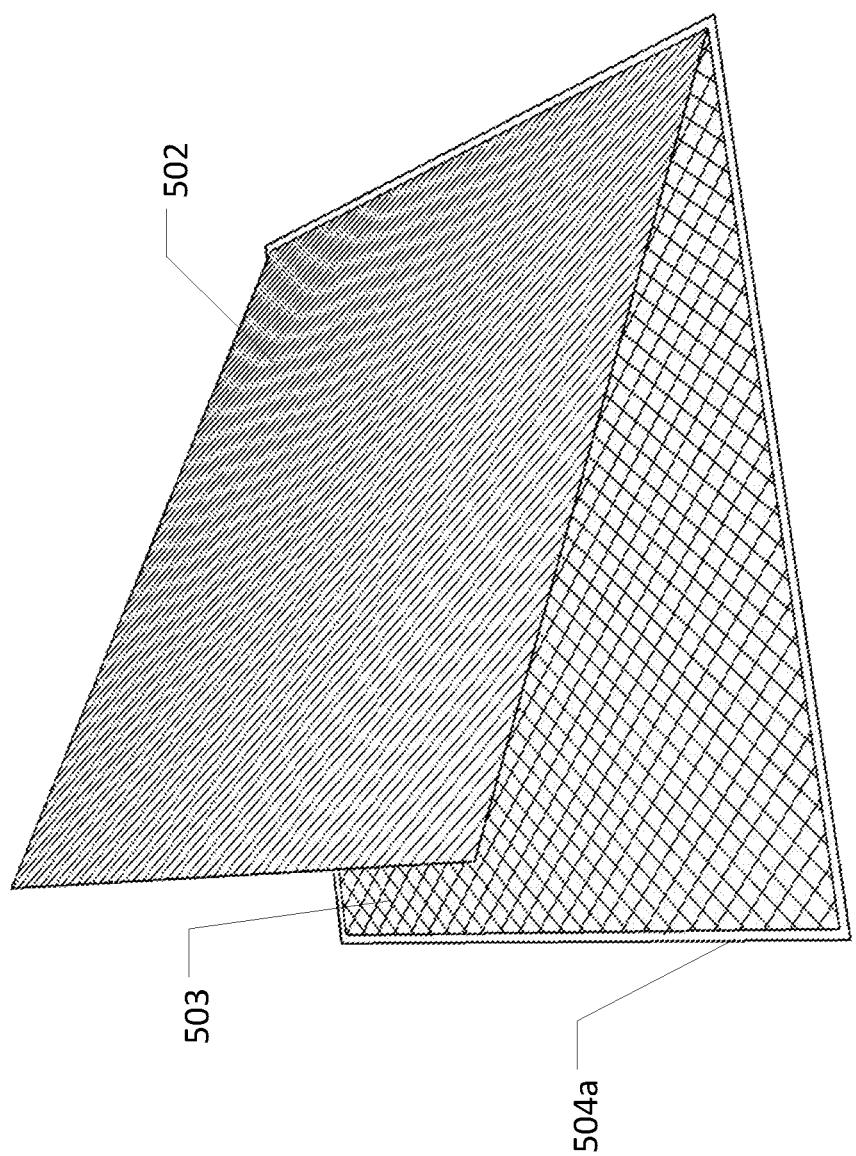

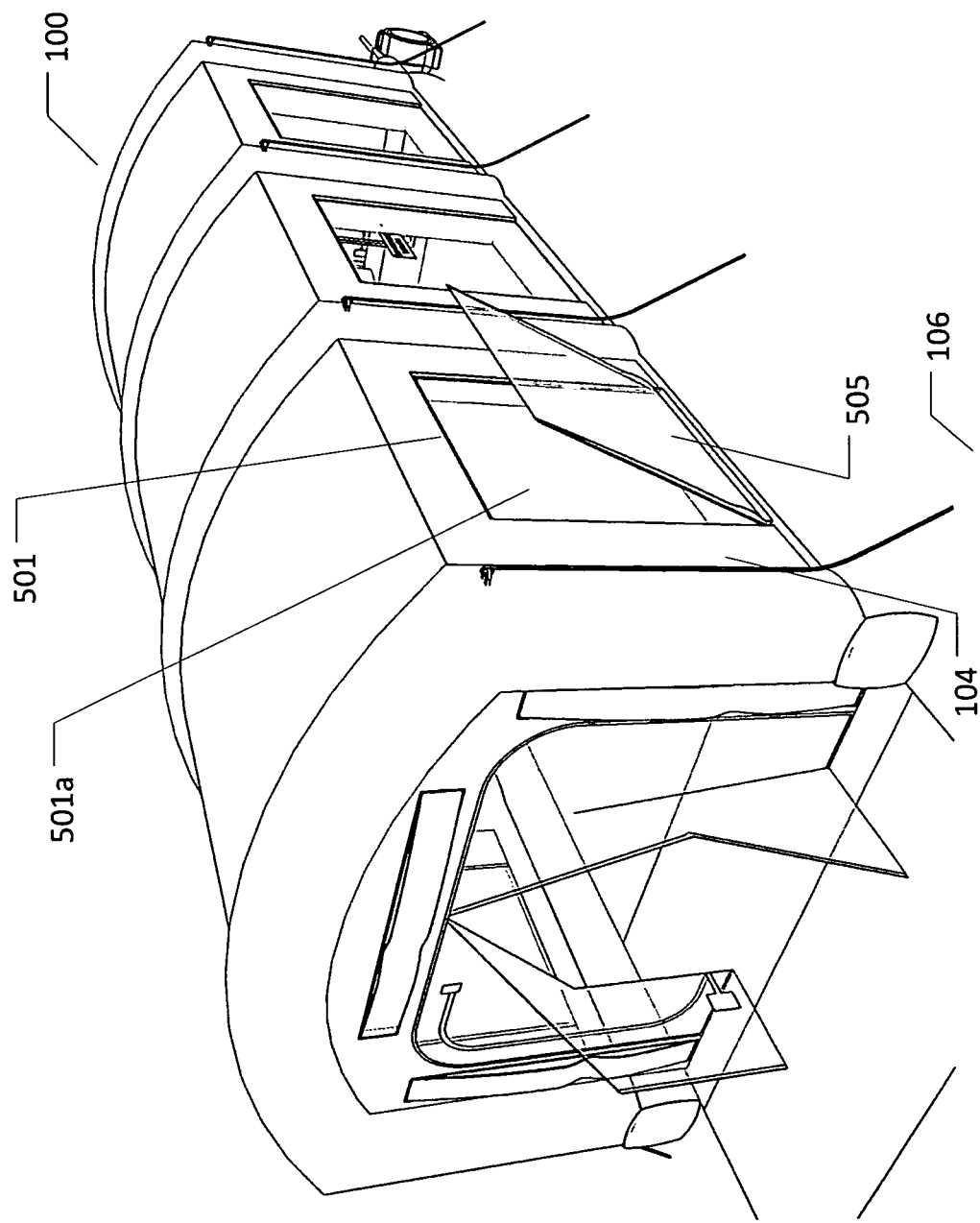

INFLATABLE BOOTH SYSTEM AND METHOD FOR APPLYING A SPRAY-ON BED-LINER TO A TRUCK BED

BACKGROUND

This disclosure relates to an inflatable booth system and method for applying a spray-on bed-liner to a truck bed.

When a car dealership purchases a truck, often the dealership may want to outfit the truck with a spray-on bed-liner. However due to environmental and other concerns, the spray-on bed-liner must be applied in an enclosed space. Larger dealerships with an expansive fleet often have an enclosed space on their lot dedicated to making such improvements. However, smaller lots with smaller resources often do not have such facilities. Instead, they must send each truck to an outside facility. However, such process puts mileage on the truck, increases the time that the truck must be away from the lot, requires additional man hours moving the truck, and therefore makes the process of applying the bed-liner more expensive. As such it would be useful to have an improved inflatable booth system and method for applying a spray-on bed-liner to a truck bed.

SUMMARY

An inflatable booth system and method for applying a spray-on bed-liner to a truck bed is herein disclosed. An inflatable bed-liner booth can comprise an inflatable frame, a roof, a floor, a plurality of wall sections, one or more air inlets, a plurality of air vents, an entry port, and one or more exhaust panels. The inflatable frame can comprise a plurality of vertical supports. The roof can connect to the top of the inflatable frame. The floor can be at the bottom of the inflatable frame. The wall sections can be defined by at least one of the inflatable frame, the roof, and the floor. The wall sections together with the inflatable frame, the roof, and the floor can define an interior space and an exterior space. The air inlets can supply air to the inflatable frame. The air vents on the surface of the inflatable frame within the interior space. The air vents can allow air to pass from the inside of the inflatable frame to the interior space. The entry port can be placed on one of the wall sections. The entry port can comprise a slit capable of allowing a truck bed to pass from the exterior space to the interior space. The exhaust panels placed in the wall sections. Each of the exhaust panels can comprise a filter.

A method for applying a spray-on bed-liner to a truck bed is herein disclosed. The method can comprise the steps of inflating a bed-liner booth. The bed-liner booth can comprise an inflatable frame, a roof, a floor, a plurality of wall sections, one or more air inlets, a plurality of air vents, an entry port, and one or more exhaust panels. The inflatable frame can comprise a plurality of vertical supports. The roof at the top of the inflatable frame. The floor at the bottom of the inflatable frame. The wall sections defined by at least one of the inflatable frame, the roof, and the floor. The wall sections together with the inflatable frame, the roof, and the floor can define an interior space and an exterior space. The air inlets that can supply air to the inflatable frame. The air vents on the surface of the inflatable frame within the interior space. The air vents can allow air to pass from the inside of the inflatable frame to the interior space. The entry port can be placed on one of the wall sections. The entry port can comprise a slit capable of allowing a truck bed to pass from the exterior space to the interior space. The exhaust panels can be placed in the wall sections. Each of the exhaust panels can comprise a filter. Furthermore, the steps can include pushing the air from the inflatable frame into the interior space through the air vents to create a positive pressure within the interior space, receiving the truck bed within the entry port, and applying a truck bed-liner to the truck bed. Lastly, the method can comprise the step of filtering the air that passes from the interior space to the exterior space through the exhaust panels.

BRIEF DESCRIPTION OF THE DRAWINGS

FIG. 5B illustrates a filter connected to a sheet barrier.

FIG. 5D illustrates an external view of bed-liner booth comprising a flap over an orifice.

DETAILED DESCRIPTION

Described herein is an improved system and method for applying a spray-on bed-liner to a truck bed. The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

Figure 1:
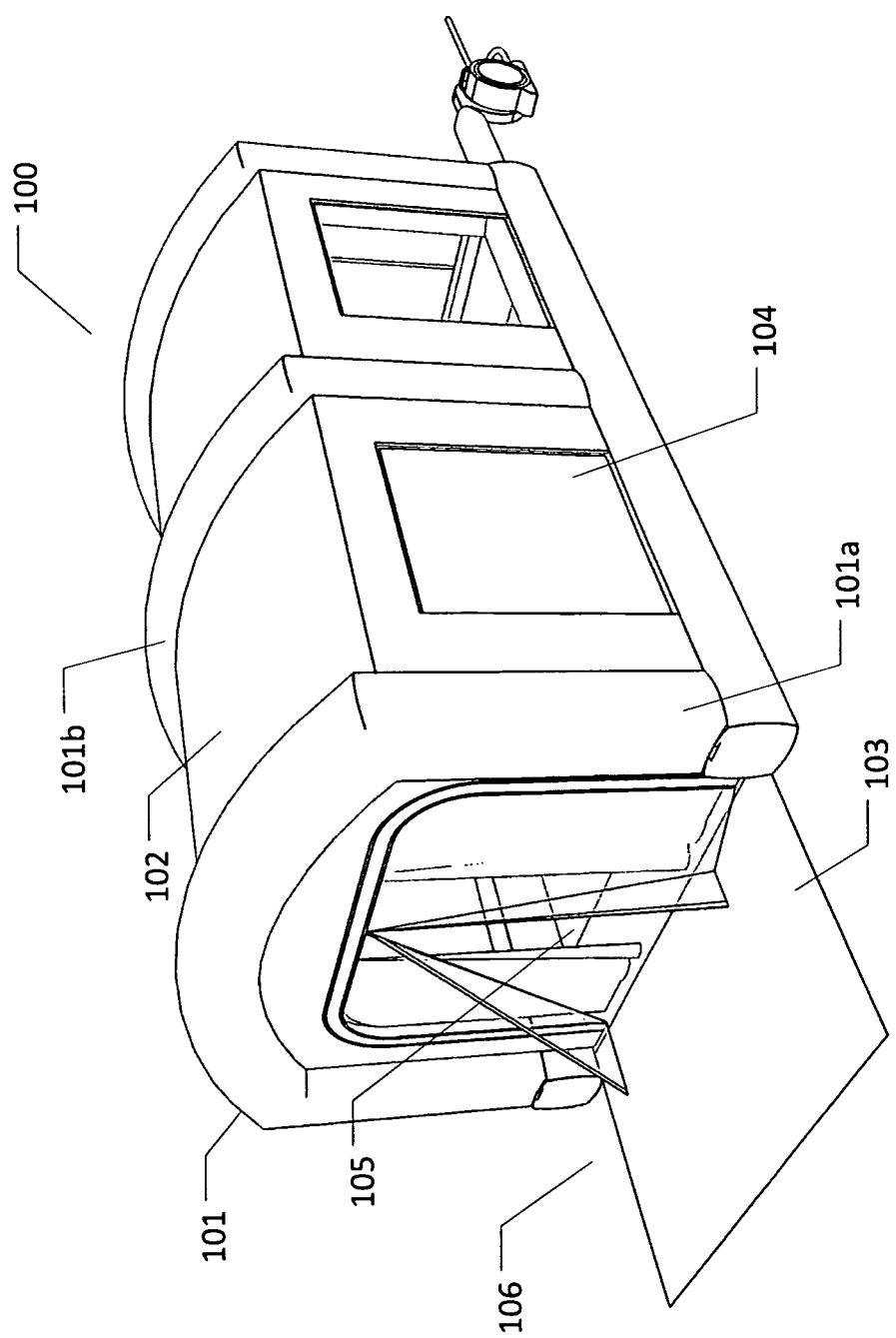
FIG. 1 illustrates a bed-liner booth.

FIG. 1 illustrates a bed-liner booth 100. In one embodiment bed-liner booth 100 can comprise an inflatable frame 101, a roof 102, a floor 103, and a plurality of wall sections 104. Bed-liner booth 100 can be an inflatable mobile booth that provides an enclosed space for automotive paint repairs.

In this embodiment, bed-liner booth 100 can be used for spray coating truck beds. Therefore, bed-liner booth 100 can prevent chemicals used in bed-liners from being released outside bed-liner booth 100. Additionally, bed-liner booth 100 can prevent any solid particles from the outer surroundings to contaminate the spray-on bed-liner when being applied to a truck bed. As such, applying the spray-on bed-liner within bed-liner booth 100 can produce a better and smooth coating of paint on a truck bed. Further, bed-liner booth 100 can be made of fire-resistant material such as a PVC tarpaulin.

Inflatable frame 101 can provide structure to bed-liner booth 100. Inflatable frame 101 can comprise a plurality of vertical supports 101a, in one embodiment. Each vertical support 101a can be placed at the opposite sides of bed-liner booth 100 and positioned parallel to each other. In another embodiment, inflatable frame 101 can further include one or more horizontal supports 101b. Horizontal supports 101b can horizontally connect each vertical supports 101a together. Roof 102 can be connected at the top portion of inflatable frame 101. As such, roof 102 can serve as a top covering for the inner portion of bed-liner booth 100. In one embodiment, roof 102 can comprise of translucent or transparent materials that can allow natural lights to enter bed-liner booth 100. Floor 103 can be connected at the bottom portion of inflatable frame 101. Therefore, floor 103 can serve as a bottom covering for the inner portion of bed-liner booth 100. In one embodiment, floor 103 can comprise a durable plastic sheeting material that can include but is not limited to high-density polyethylene. As such, floor 103 can withstand high temperatures. Moreover, HDPE can protect the ground or the outer surroundings from the chemicals that can be used within bed liner booth 100.

Wall sections 104 can be connected on each sides of inflatable frame 101. Further, in one embodiment, roof 102, floor 103, and wall sections 104 can comprise of a durable sheet material such as plastic, or fabric that can include but are not limited to PVC tarpaulins or oxford nylon. In one embodiment, wall sections can be transparent or translucent to allow light into the booth and to be able to see inside and outside of the booth for safety reasons. Furthermore, inflatable frame 101, roof 102, floor 103, and wall sections 104 can define an interior space 105 and an exterior space 106. Interior space 105 can be the working space created within bed-liner booth 100 while exterior space 106 can be the area outside bed-liner booth 100.

Figure 2:
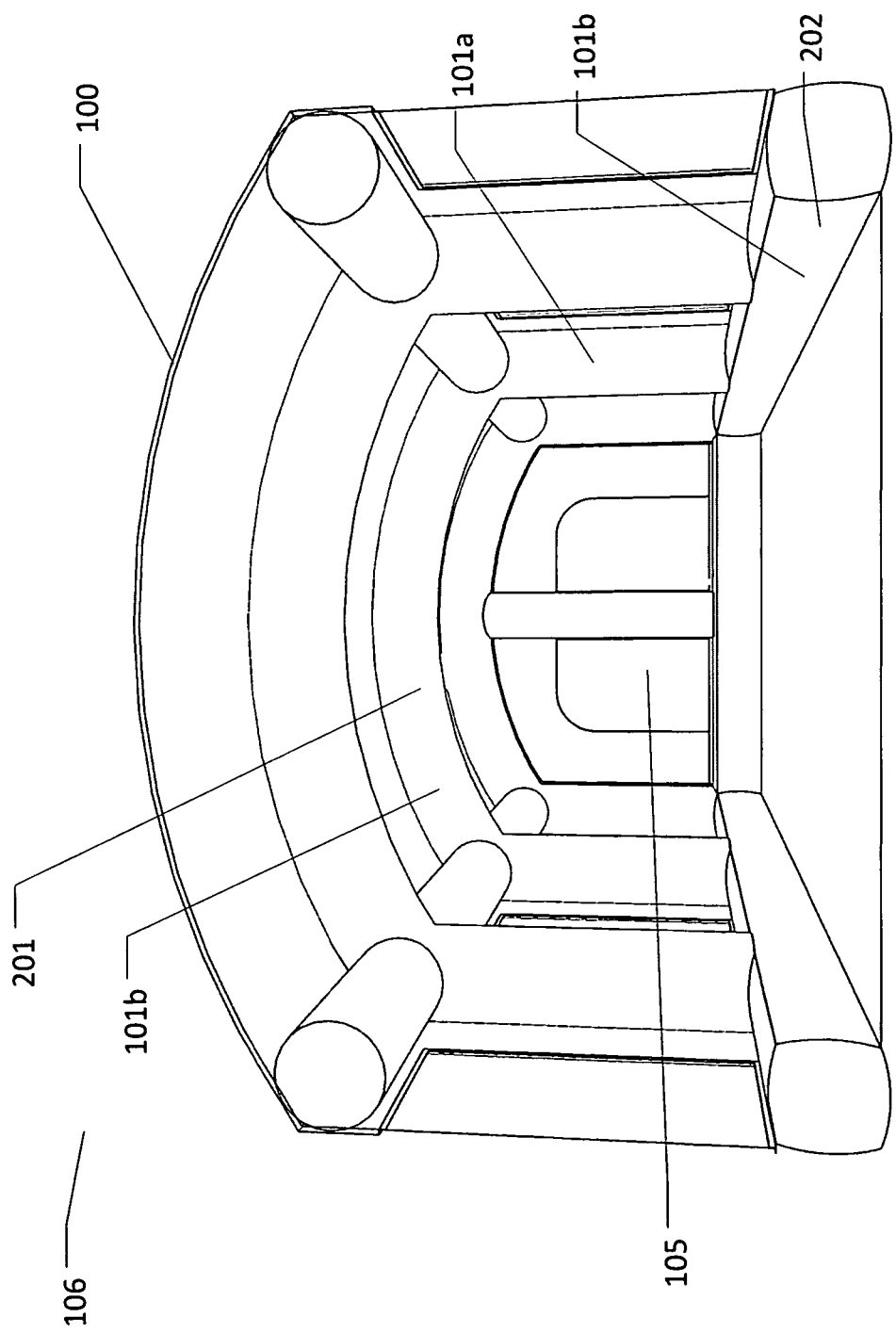
FIG. 2 illustrates interior space of a bed-liner booth.

FIG. 2 illustrates interior space 105 of bed-liner booth 100. In this embodiment, vertical supports 101a can define the vertical boundaries of interior space 105 and exterior space 106. Furthermore in one embodiment, horizontal supports 101b can comprise one or more overhead beams 201 that each connect pairs of vertical supports 101a at the top, crossing the middle section of bed-liner booth 100. In another embodiment, horizontal supports 101b can comprise a base frame 202 that connects each vertical supports 101a at the bottom. As such, horizontal supports 101b can go along the bottom sides of vertical support 101a. Further in one embodiment, overhead beams 201 can form an arc at the top portion of bed-liner booth 100. In one embodiment, all vertical supports 101a and horizontal supports 101b can be connected such that air can flow freely between all supports.

Figure 3:
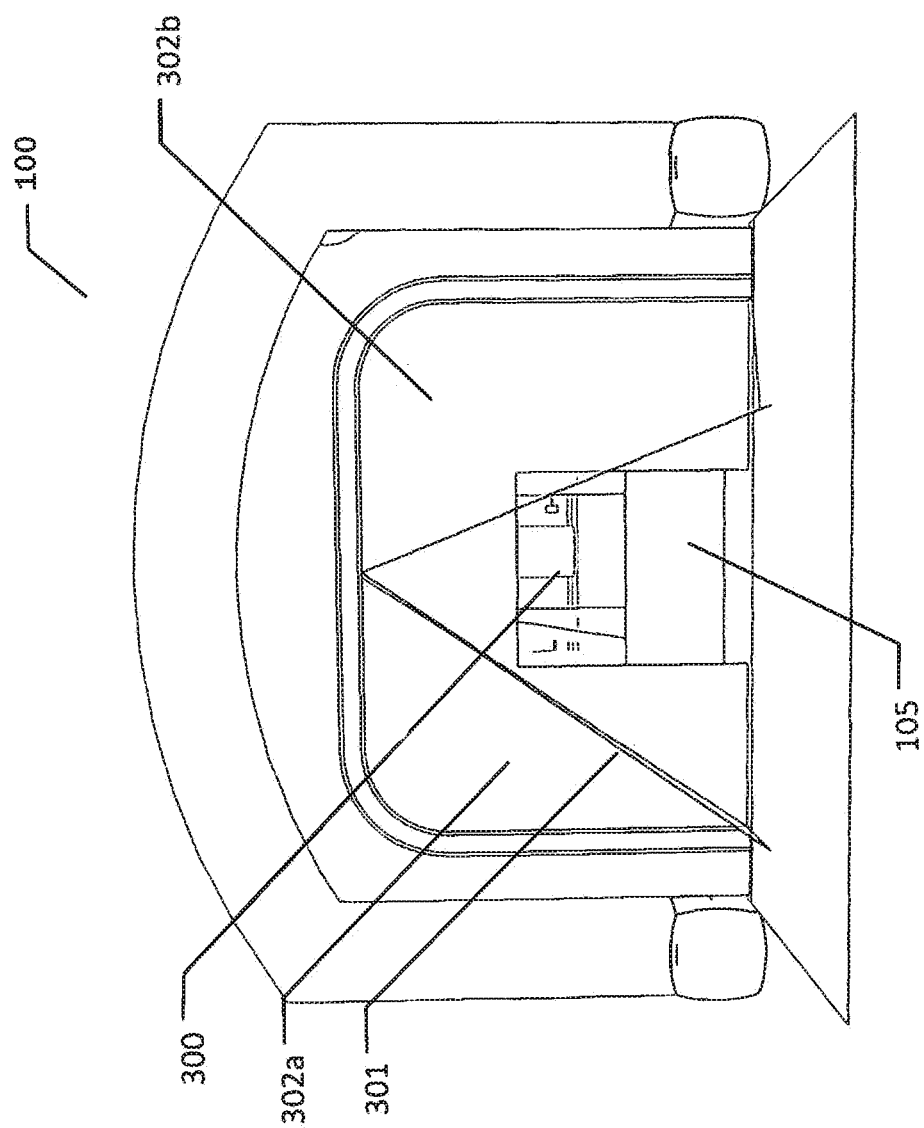
FIG. 3 illustrates one of the wall sections comprising an entry port.

FIG. 3 illustrates one of the wall sections 104 comprising an entry port 300. Entry port 300 can be an opening accessible to a truck bed. Further in this embodiment, wall section 104 can comprise a slit 301. Slit 301 can be a long cut placed at the middle portion of wall section 104. As such, slit 301 can create a first flap 302a and a second flap 302b.

In such structure, flaps 302 can be separable from slit 301 creating an opening that is accessible to the truck bed. Furthermore, flaps 302 can be made of a transparent or translucent material, which can allow workers to see interior space 105 of bed-liner booth 100.

Figure 4A:
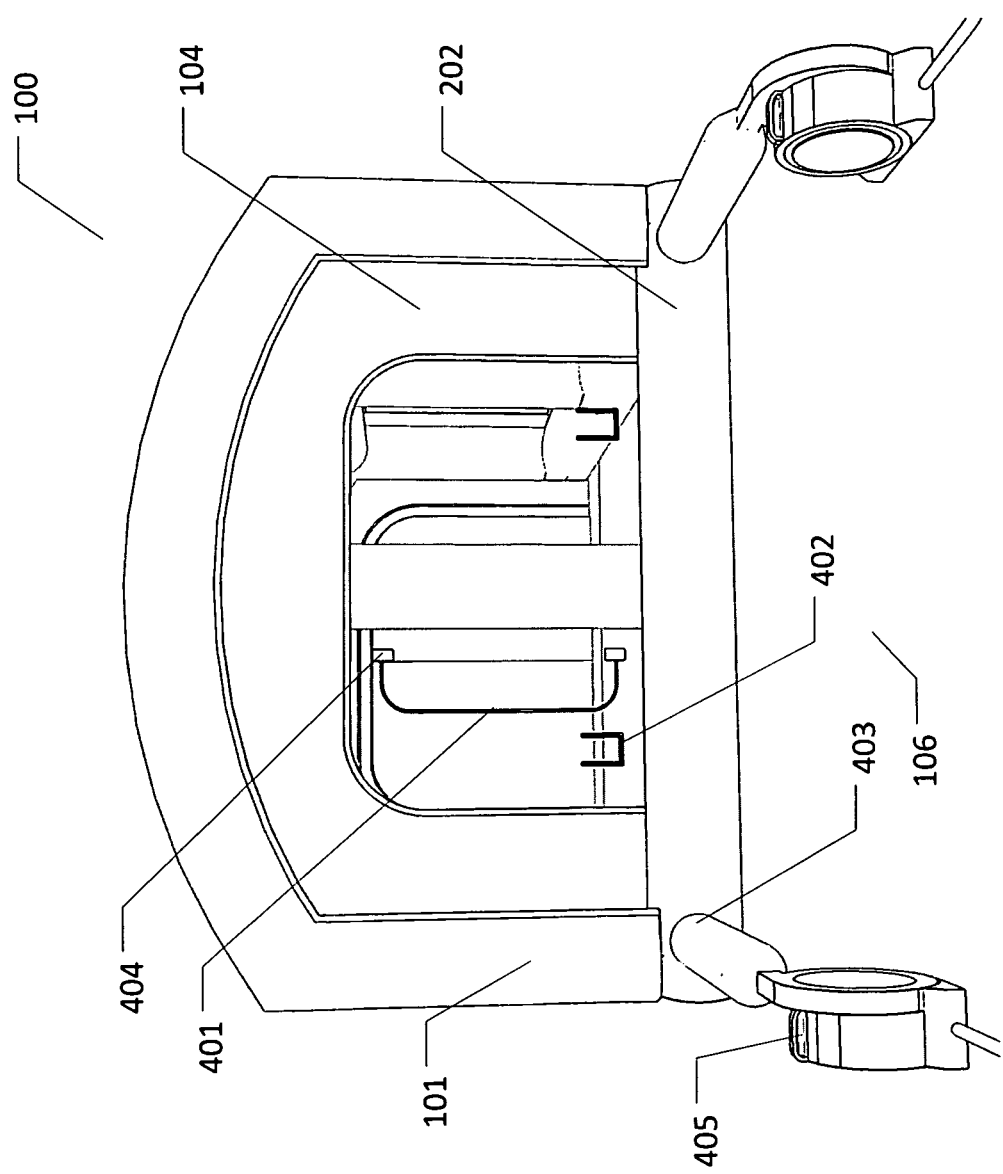
FIG. 4A illustrates another wall section comprising a passage, one or more orifices, and a pair of air inlets.

FIG. 4A illustrates another wall section 104 comprising a passage 401, one or more orifices 402, and a pair of air inlets 403. Passage 401 can be a re-sealable opening at a portion of wall section 104. As such, passage 401 can serve as an entry and exit point of bed-liner booth 100. In one embodiment, passage 401 can be re-sealable through a fastener 404. Orifices 402 can be a re-sealable opening placed at the bottom portion of wall section 104, in one embodiment. In such embodiment, orifices 402 can also comprise fastener 404. Furthermore, orifices 402 can allow hoses from an air-pressured device to pass through wall section 104. For purposes of this disclosure, fastener 404 can be any device that can temporarily connect and/or separate two objects together. Thus, fastener 404 can include but is not limited to zipper, or hook and loop fasteners. Passages 401 used for non-emergency entry and exit are preferred to use a zipper, as such device is easy to both open and close in a reasonable amount of time. Emergency exits and entries preferably connect by hook and loop fasteners because, while such connection is more difficult to connect and seal quickly, it can quickly tear away to create a large opening.

Air inlet 403 can allow air from exterior space 106 to enter and fill up inflatable frame 101. As such, air inlet 403 can be placed at the outer surface of inflatable frame 101. Moreover, air inlet 403 can be connectable to an air pump 405. In one embodiment, air inlet 403 can be placed at the bottom. In such embodiment, air inlet 403 can be connected to base frame 202.

Figure 4B:
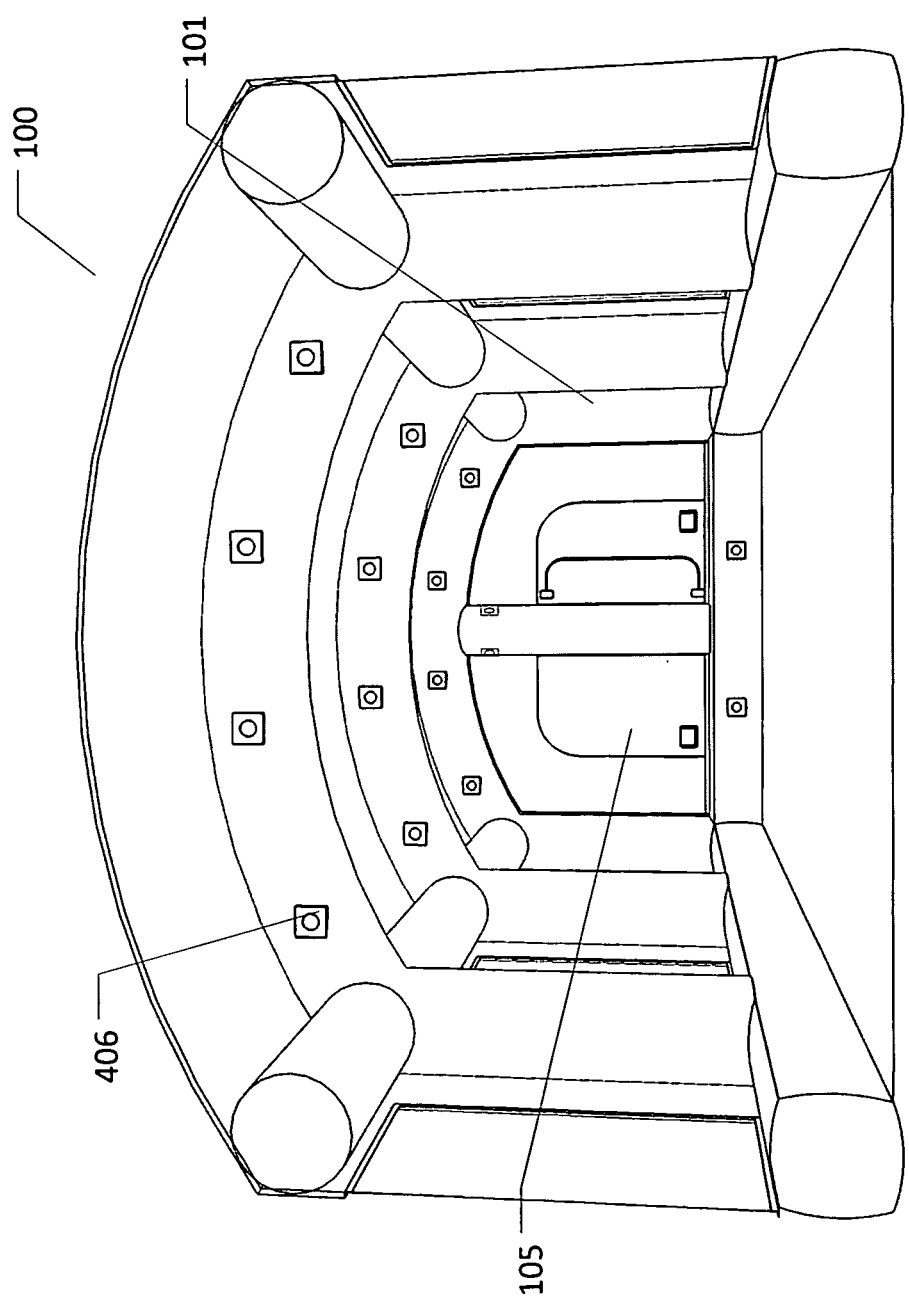
FIG. 4B illustrates internal view of bed-liner booth wherein inflatable frame comprises a plurality of air vents.

FIG. 4B illustrates internal view of bed-liner booth 100 wherein inflatable frame 101 comprises a plurality of air vents 406. Air vents 406 can allow air to flow from inflatable frame 101 to interior space 105. As such, air vents 406 can allow the air that is pumped from air pump 405 to enter interior surface 105. Moreover, air vents 406 can capture particulates within air pumped by air pump 405 to prevent such particulates from contaminating the bed-liner spray-on process.

Figure 5A:
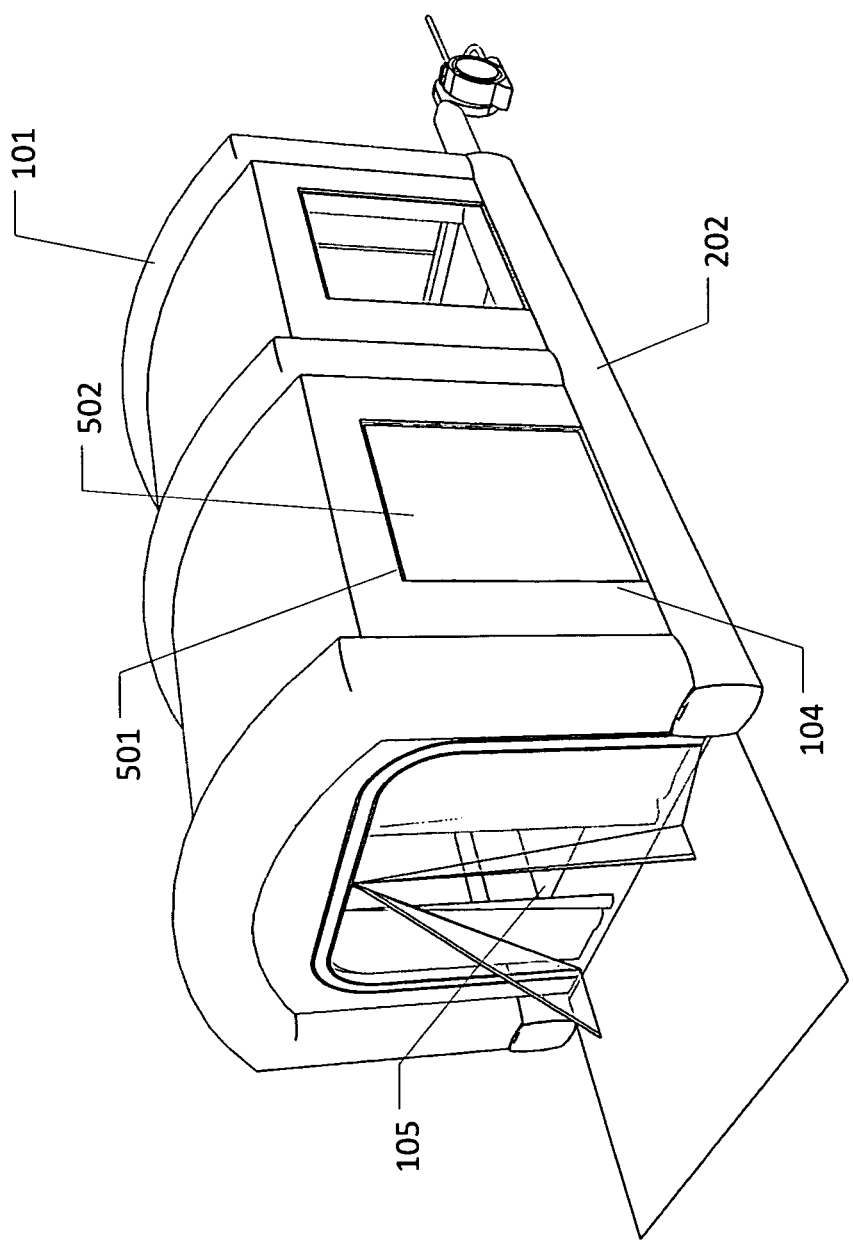
FIG. 5A illustrates one or more exhaust panels placed at one or more wall sections.

FIG. 5A illustrates one or more exhaust panels 501 placed at one or more wall sections 104. Exhaust panels 501 can be mounted within wall section 104. Furthermore, exhaust panel 501 can comprise a filter 502. Filter 502 can prevent passing impurities and solid particles, while allowing clean air to pass through exhaust panel 501. Further in one embodiment, filter 502 can be replaceable with a new filter 502.

FIG. 5B illustrates filter 502 connected to a sheet barrier 503. Sheet barrier 503 hold filter in place on wall section 104. In one embodiment, filter 502 can be permanently attached with sheet barrier 503 through methods that can include but are not limited to sewing, or through use of adhesive materials. Sheet barrier 503 can be attachable to the inner surface of wall section 104 through a fastening device 504. Fastening device 504 can include but is not limited to a zipper, snap fasteners, and/or a hook and loop fastener. In such embodiment, one side of sheet barrier 503 can comprise a first fastening device 504a.

Figure 5C:
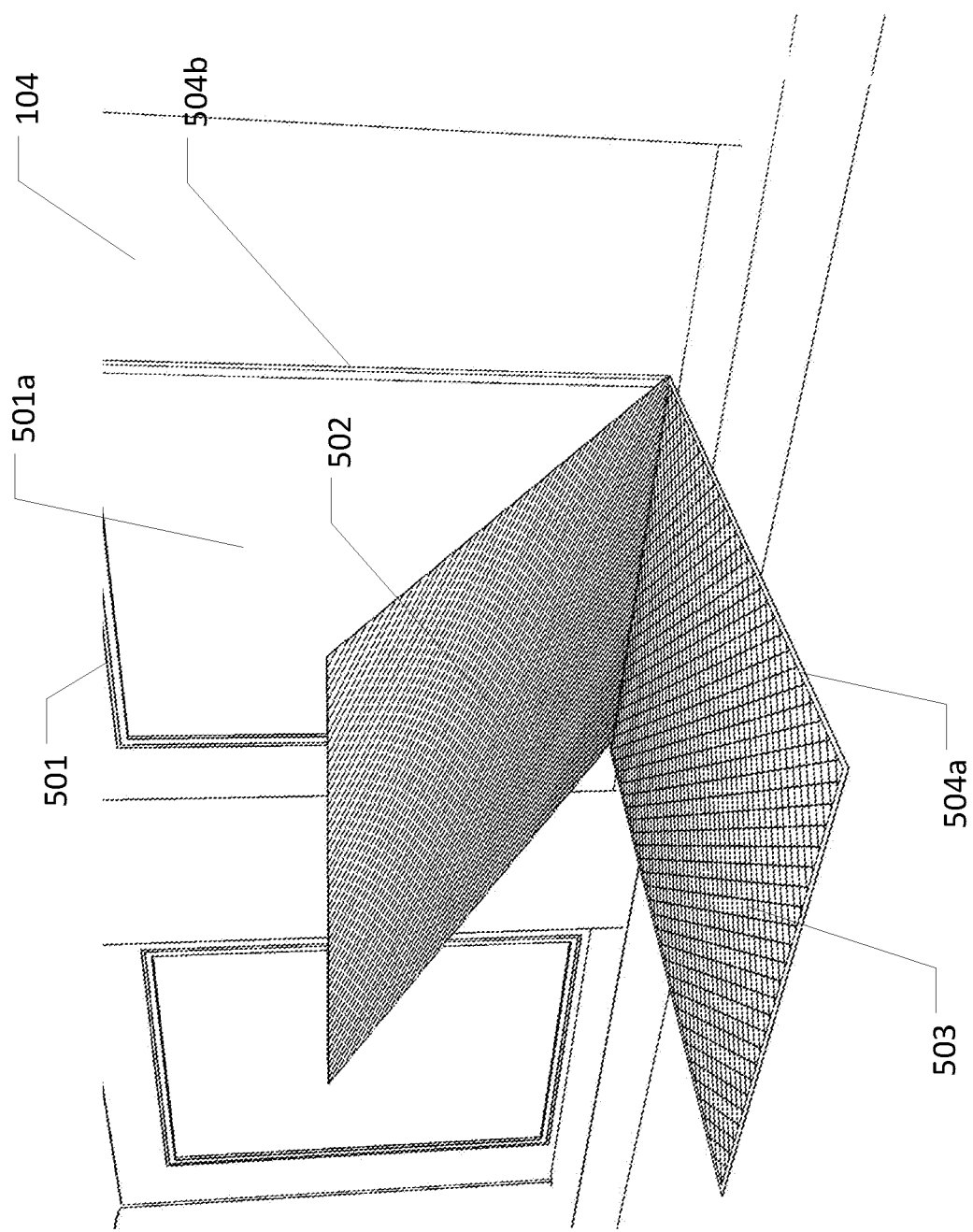
FIG. 5C illustrates the inner surface of wall section comprising exhaust panel.

FIG. 5C illustrates the inner surface of wall section 104 comprising exhaust panel 501. To sheet barrier 503 with wall section 104, a second fastener 504b mateable with first fastening device 504a can be attached at the inner surface of wall section 104 to cover an orifice 501a in wall section 104. As such, second fastener 504b can be placed around the edges of exhaust panel 501. In this embodiment, the position of first fastener 504*a* can be compatible with the position of second fastener 504*b*. In such embodiment, filter 502 can be attached to exhaust panel 501 by fastening first fastener 504*a* in sheet barrier 503 with second fastener 504*b* on wall sections 104.

FIG. 5D illustrates an external view of bed-liner booth 100 comprising a flap 505 over orifice 501*a*. Flap 505 can allow air coming out from exhaust panels 501 to move in one direction. In this embodiment, flap 505 can direct the air from exhaust panels 501 to go upward. As such, the outer edges of flap 505 can be attached to wall section 104, leaving only a portion open to direct air flow out. In a preferred embodiment, air can be directed upward by leaving the top of flap 505 open. Outer edges of flap 505 can connect to wall section 104 through methods that can include but are not limited to sewing, or use of adhesive materials, or using temporary fastening means such as hook and loop fasteners.

Figure 6A:
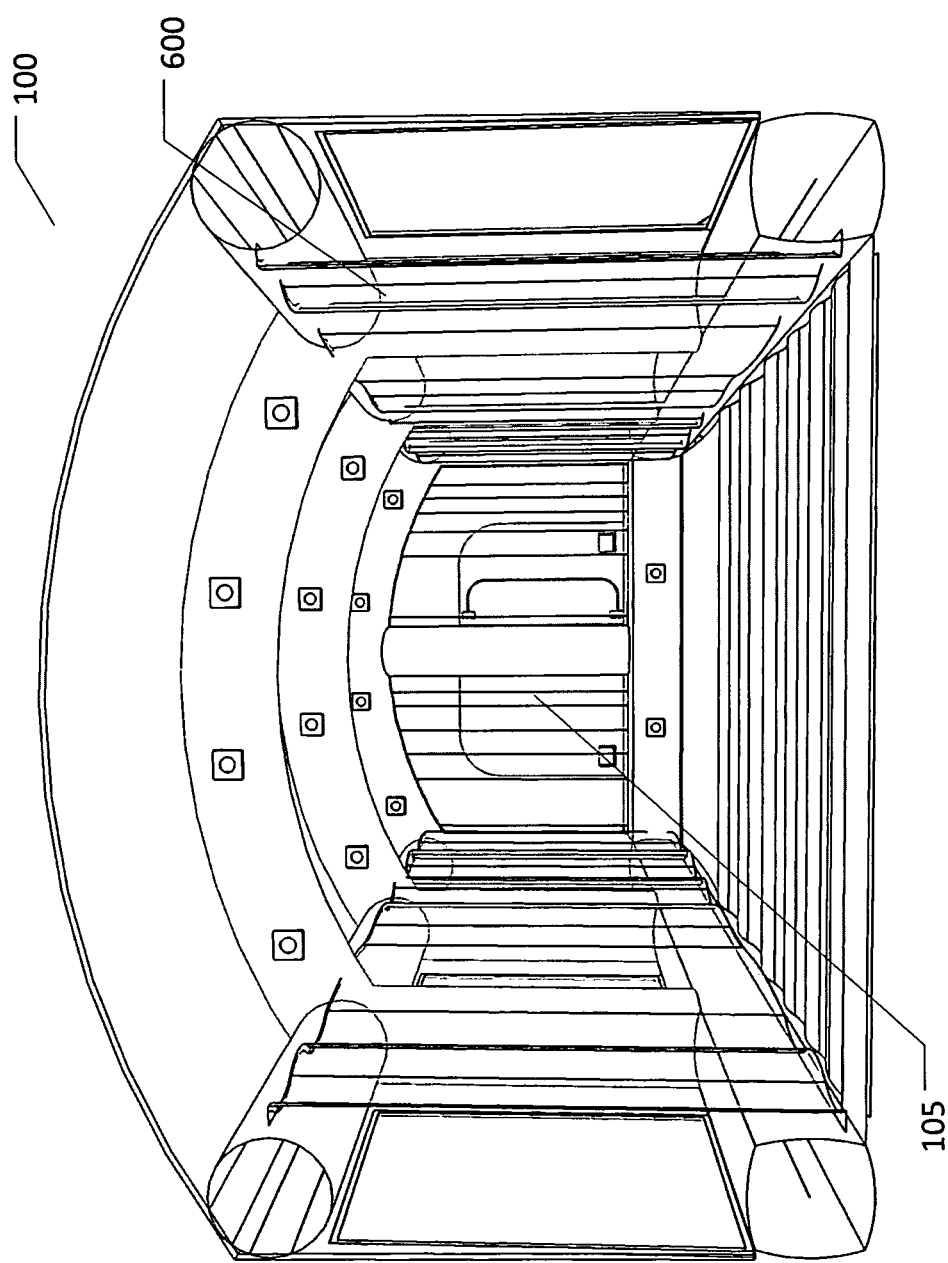
FIG. 6A illustrates interior space of bed-liner booth further comprising a liner.

FIG. 6A illustrates interior space 105 of bed-liner booth 100 further comprising a liner 600. Liner 600 can be another layer of durable material such as plastic, or fabric that can cover the inner surface of bed-liner booth 100. In such embodiment, liner 600 can prevent the spray-on bed-liner material from attaching to the inner surface of bed-liner booth 100.

Figure 6B:
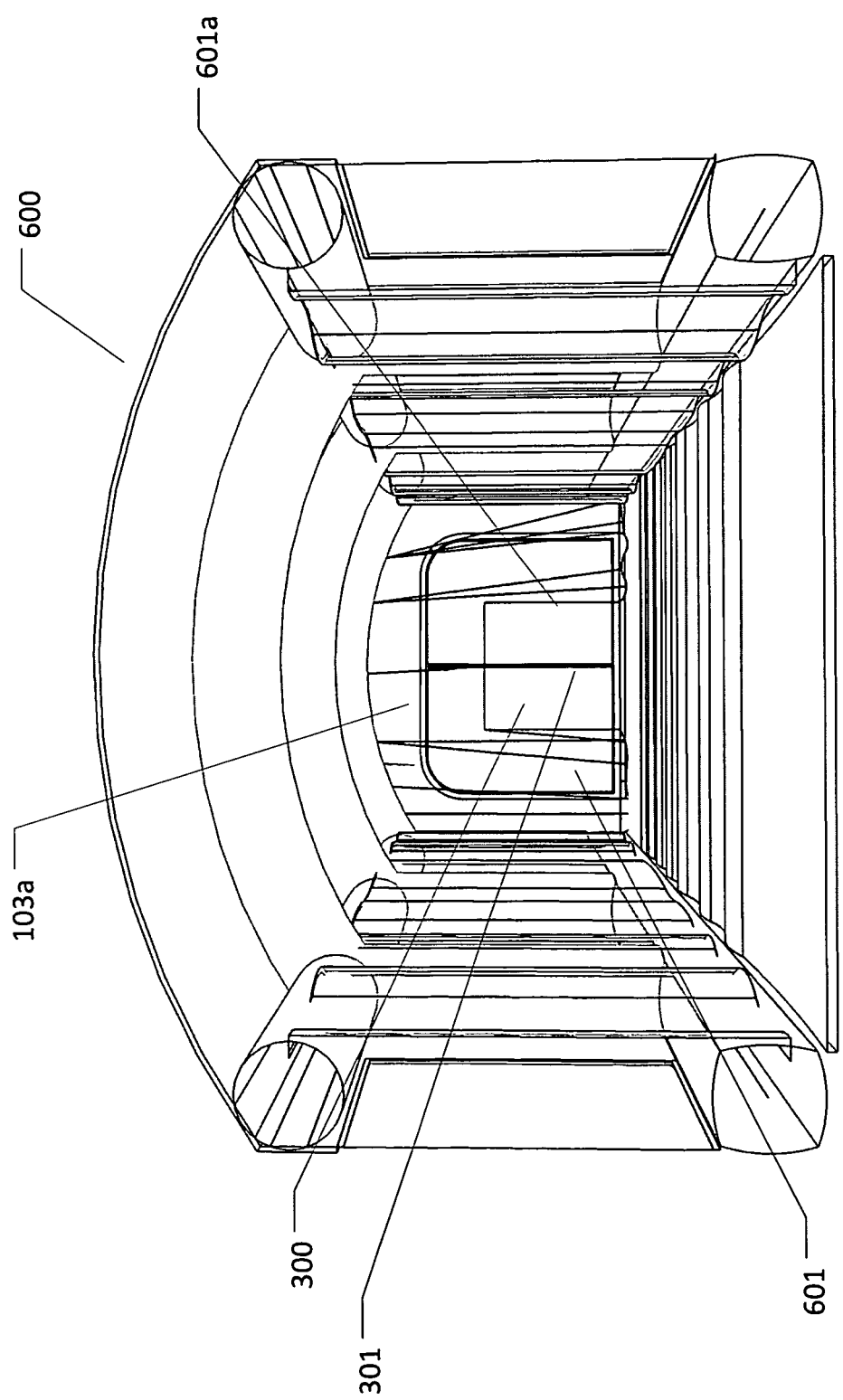
FIG. 6B illustrates a liner comprising a front lining.

FIG. 6B illustrates liner 600 comprising a front lining 601. Front lining 601 can be liner 600 placed behind entry port 300. Moreover, front lining 601 can be in a C-shape. As such, front lining 601 can comprise a cutaway 601*a*. Cutaway 601*a* can be placed at the bottom of the middle section of front lining 601, which can be placed directly behind slit 301 of wall section 104. In one embodiment, liners 600 can be permanently attached within the inner surface of bed-liner booth 100. In another embodiment, liners 600 can be a separate material placeable within bed-liner booth 100. As such, liners 600 can be removed and placed within inner surface of bed-liner booth 100.

Figure 7A:
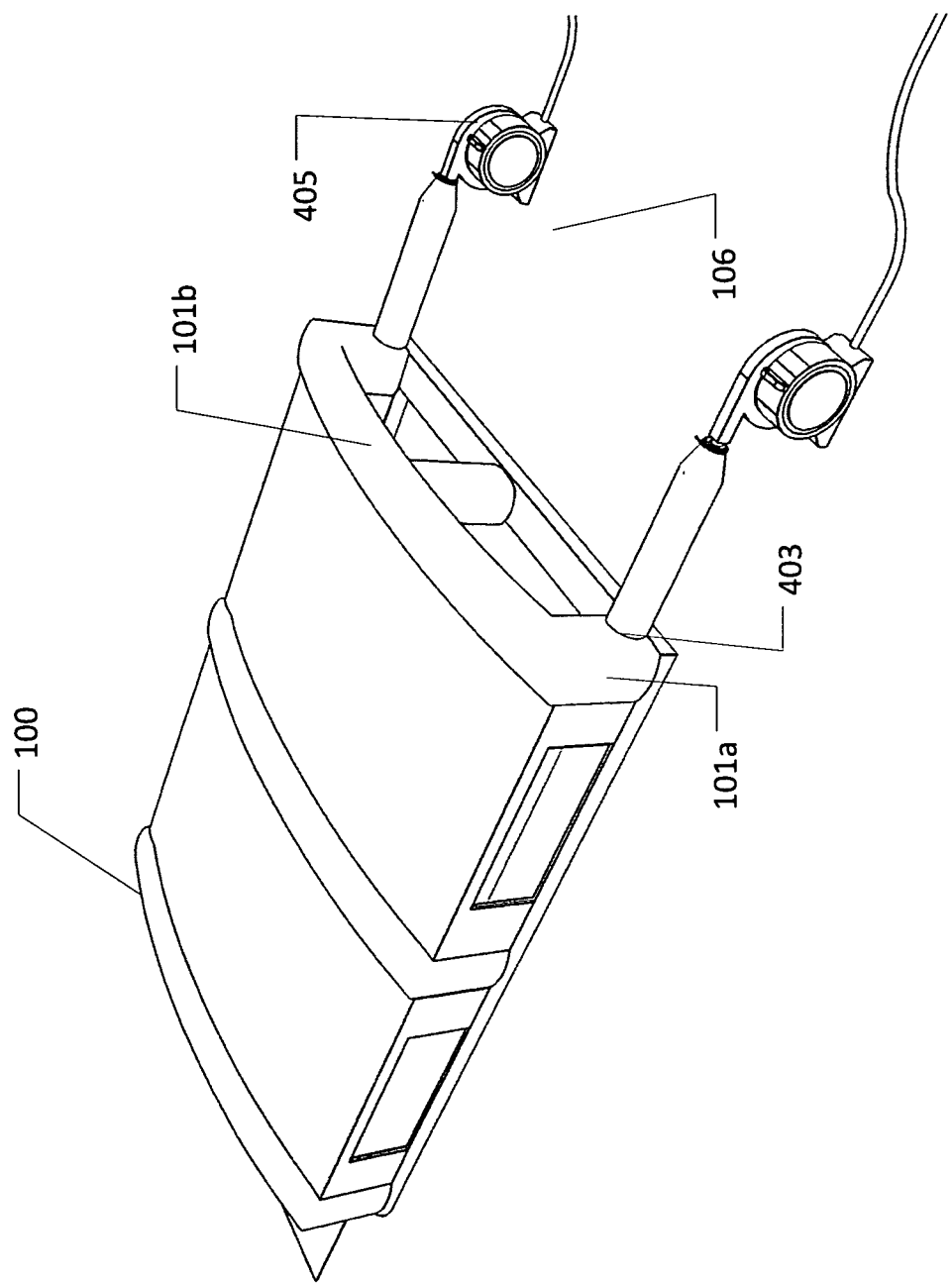
FIG. 7A illustrates how a bed-liner booth can be erected.

FIG. 7A illustrates how bed-liner booth 100 can be erected. Air pumps 405 can be connected to air inlets 403 that are placed at exterior surface 106. Furthermore, the air pumped from exterior surface 106 can be pushed into inflatable frame 101 as such inflating vertical supports 101*a* and horizontal supports 101*b*.

Figure 7B:
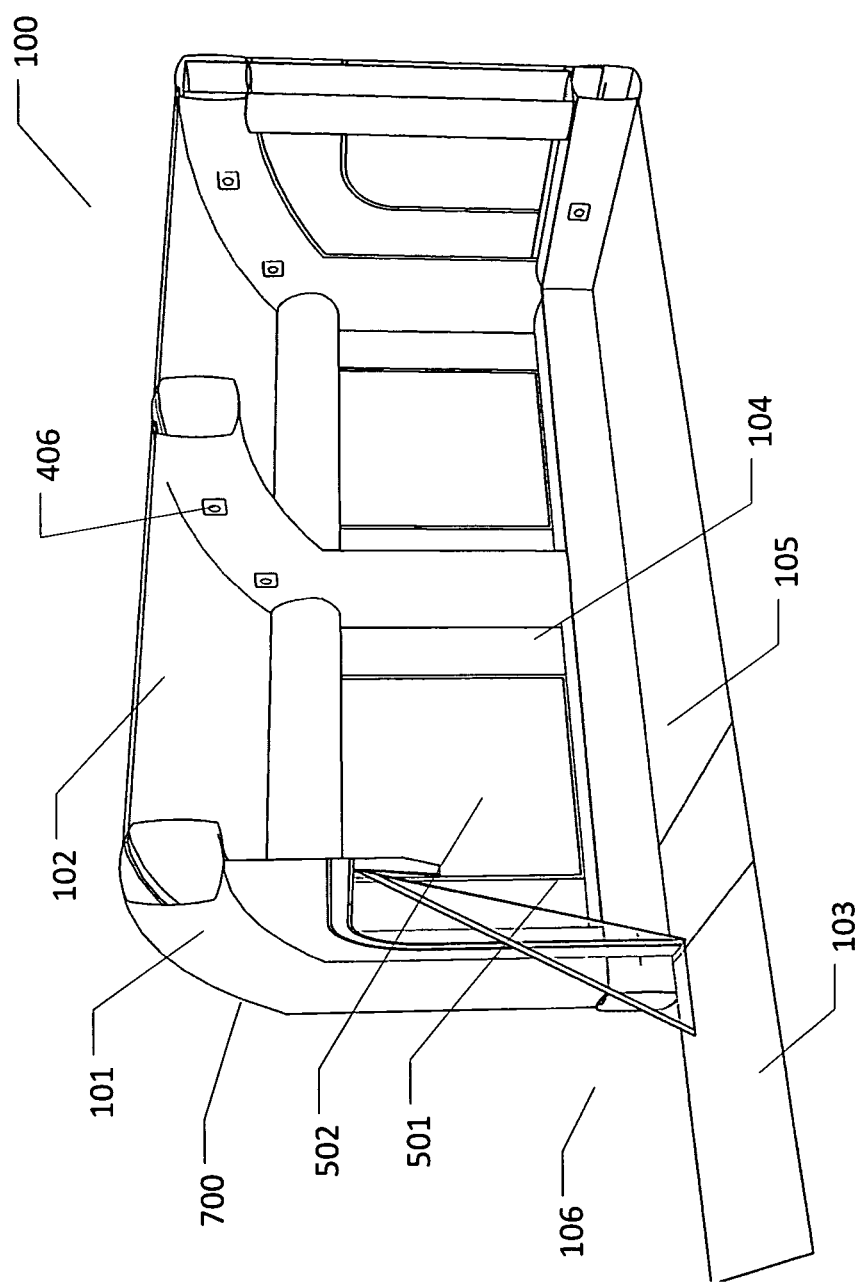
FIG. 7B illustrates internal view of bed-liner booth at an expanded state.

FIG. 7B illustrates internal view of bed-liner booth 100 at an expanded state 700. As air fills out bed-liner booth 100, roof 102, floor 103 and walls 104 can start to expand together with inflatable frame 101. Moreover, since inflatable frame 101 comprises air vents 406, air within inflatable frame 101 can be pushed out from air vents 406. This can allow positive air pressure to enter bed-liner booth 100 and preventing other particulates to enter interior surface 105. Furthermore, the air within interior surface 105 can exit through exhaust panels 501 in one or more wall sections 104. Since exhaust panels 501 can comprise filters 502. The air that is exiting through exhaust panels 501 can be filtered to prevent chemicals potentially harmful to the outside environment from escaping bed-liner booth 100.

Figure 7C:
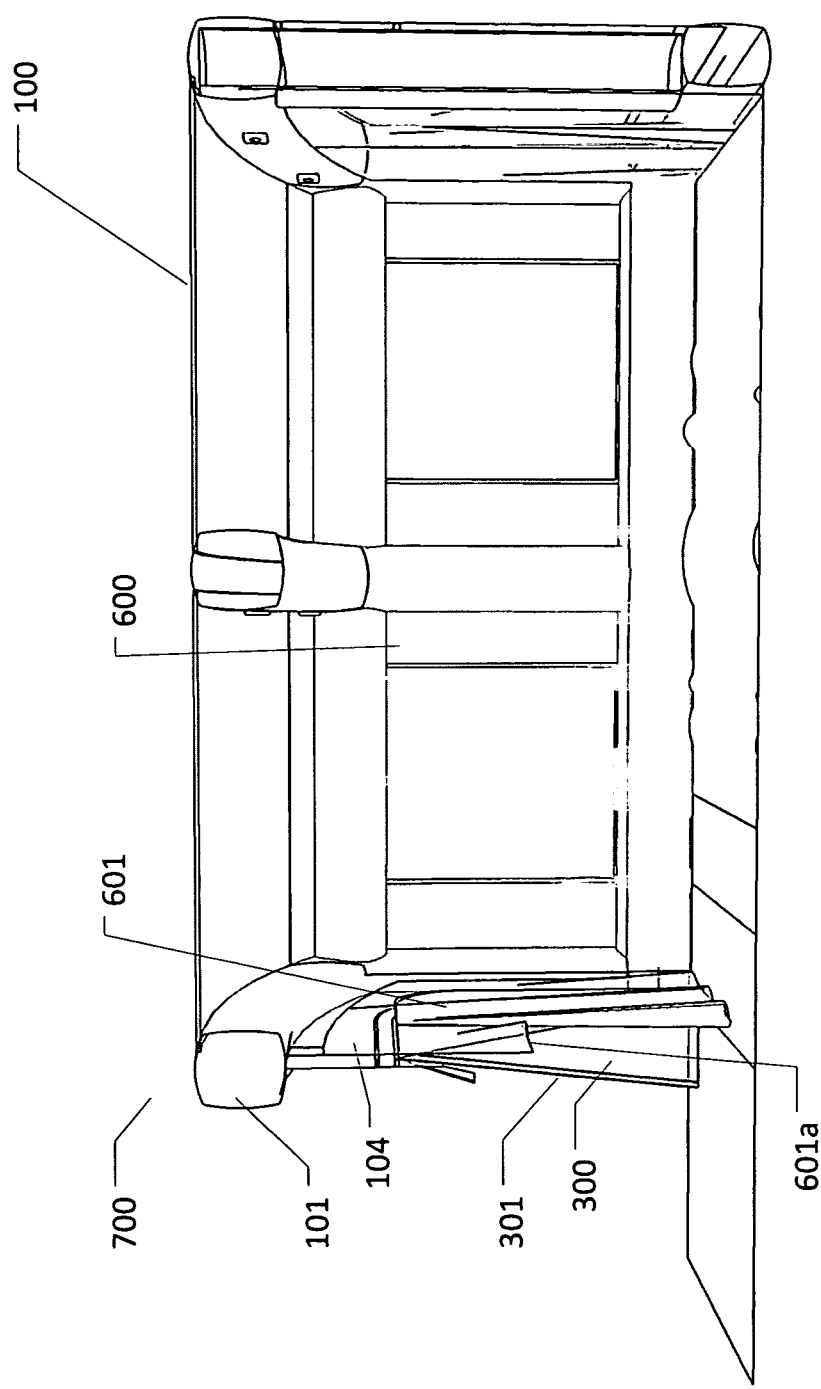
FIG. 7C illustrates a bed-liner booth in an expanded state.

FIG. 7C illustrates a bed-liner booth 100 in an expanded state 700. At expanded state 700, liner 600 can be placed within bed-liner booth 100 to cover the inner surface of bed-liner booth 100. As such, front lining 601 can be attached behind entry port 300 that can place cutaway 601*a* behind slit 301 of wall section 104.

Figure 7D:
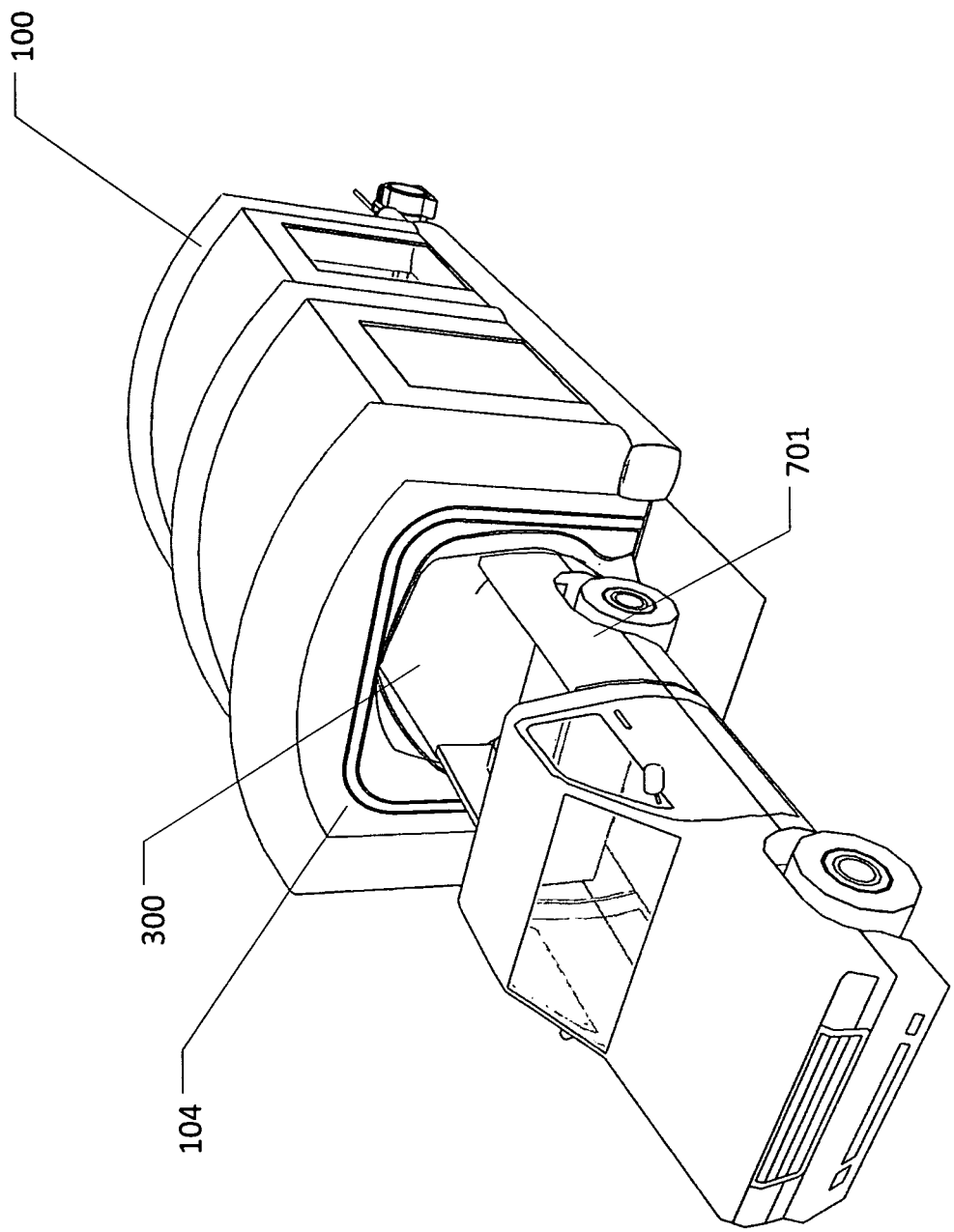
FIG. 7D illustrates a truck bed being maneuvered into a bed-liner booth.

FIG. 7D illustrates a truck bed 701 being maneuvered into bed-liner booth 100. Once liner 600 is in place, truck bed 701 can be maneuvered into entry port 300 of wall section 104.

Figure 7E:
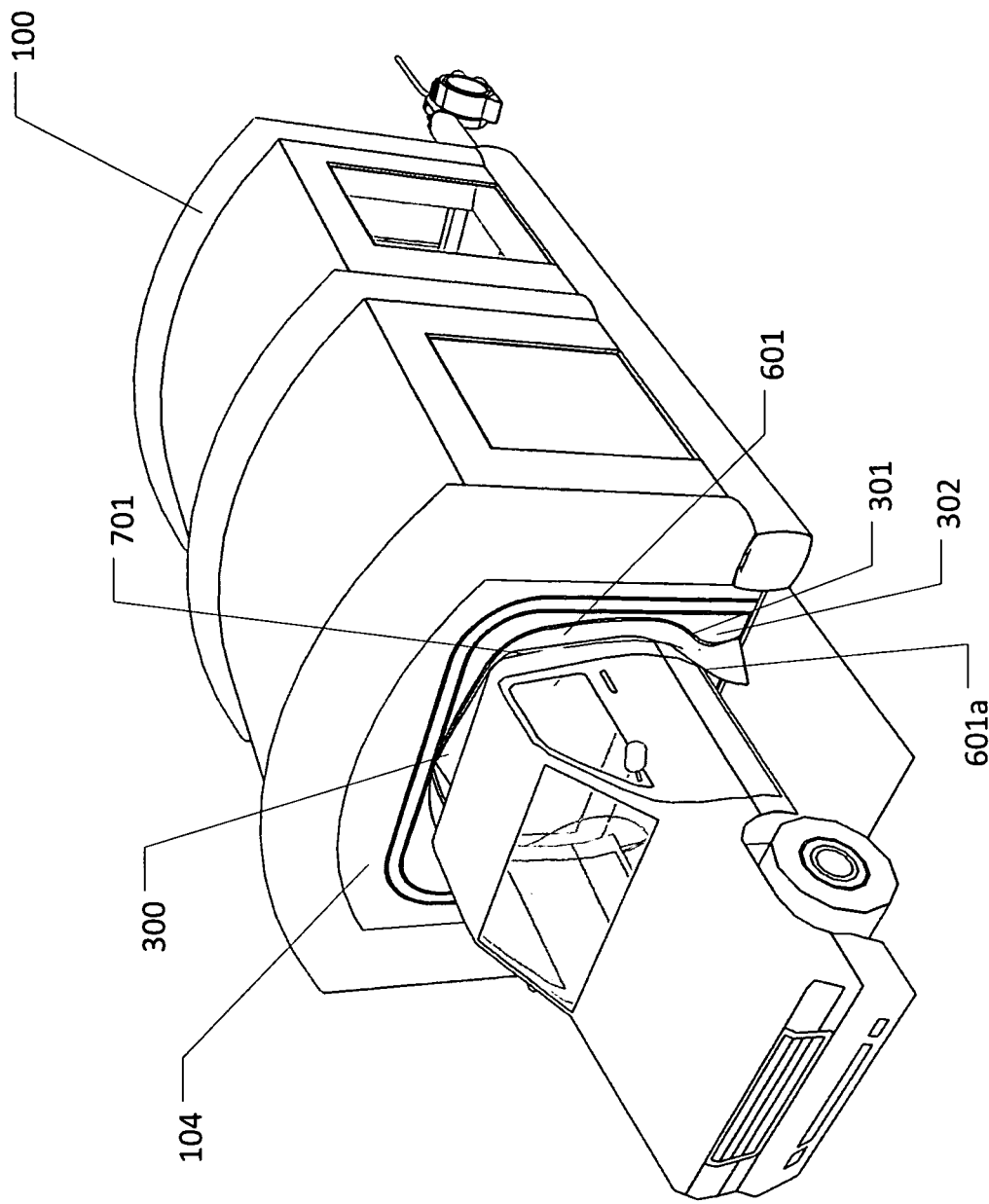
FIG. 7E illustrates truck bed received within an entry port.

FIG. 7E illustrates truck bed 701 received within entry port 300. In this embodiment, flaps 302 can split through slit 301 as truck bed 701 is maneuvered into entry port 300. Once in position, truck bed 701 can be placed within cutaway 601*a*. As such, front lining 601 can be completely draped at the top and at the sides of truck bed 701. Therefore securely enclosing truck bed 701 within bed-liner booth 100.

Figure 7F:
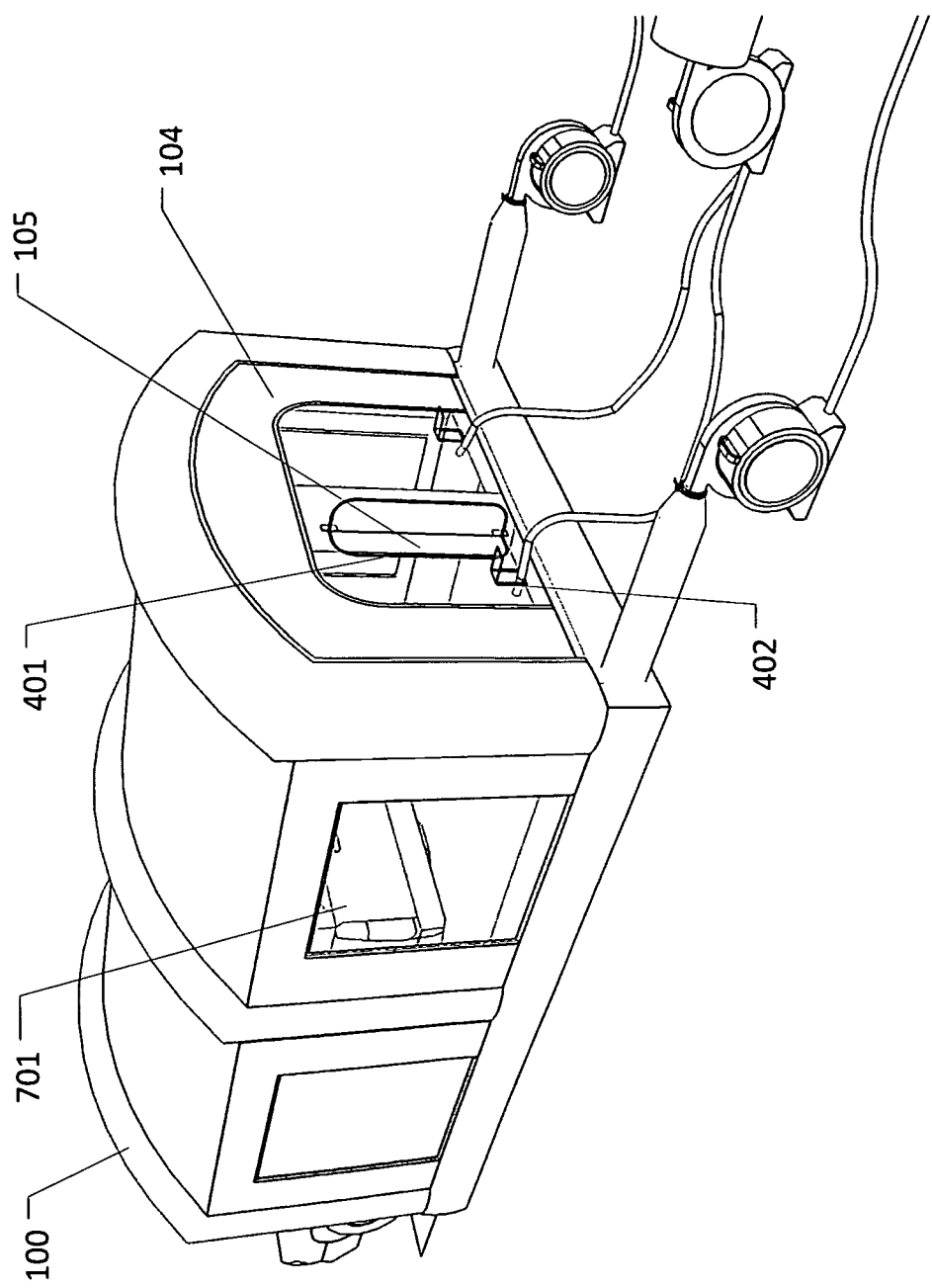
FIG. 7F illustrates truck bed within an interior space.

FIG. 7F illustrates truck bed 701 within interior space 105. Once truck bed 701 is inside bed-liner booth 100, workers can enter through passage 401 that is placed in one of wall section 104. Furthermore, an air-pressured device such as a hose can be mounted within bed-liner booth 100 through orifices 402. Moreover, workers within interior space 105 can start applying spray-on bed-liner to truck bed 701. After finishing the application, the truck can be left to dry and then removed from the booth. Once no more trucks need bed-liners, mobile bed-liner booth can be deflated and packed for transport to a new location.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. An inflatable bed-liner booth comprising an inflatable frame comprising a first pair of inflatable vertical supports, a first inflatable overhead horizontal support connected to and extending between said first pair of vertical supports, a second pair of inflatable vertical supports, a second inflatable overhead horizontal support connected to and extending between said second pair of vertical supports;

a non-inflatable roof connected to the top of said inflatable frame;

a floor at the bottom of said inflatable frame;

a peripherally extending wall system connected to said vertical supports, said wall system including a front wall section extending between said first pair of vertical supports, further wherein said inflatable frame, said roof, said floor, and said wall system define an interior space and an exterior space;

one or more air inlets to supply air to inflate said inflatable frame;

a plurality of air vents in a surface of said second overhead horizontal support, said air vents allowing air to pass from an inside of said inflatable frame to said interior space to create a positive pressure within said interior space as compared to said exterior space;

said front wall section comprising an entry port, wherein said entry port is operable to allow a truck bed of a truck to pass from said exterior space to said interior space, while a truck cab of said truck extends out into said exterior space;

a front lining placed behind said entry port, said front lining being operable to isolate said truck bed from said truck cab such that said truck bed is enclosed within the interior space of said bed-liner booth and said truck cab extends out into said exterior space; and one or more exhaust panels placed in said peripherally extending wall system, each of said exhaust panels comprising a filter, said booth configured to drive air only by positive pressure through said exhaust panels.

2. The system of claim 1, further comprising:
a third pair of inflatable vertical supports positioned between said first and second pairs of vertical supports, a third inflatable overhead horizontal support connected to and extending between said third pair of vertical supports;
a plurality of air vents in a surface of said third overhead horizontal support.

3. The system of claim 2 further comprising an inflatable generally U-shaped base frame connected at a bottom of said first, second, and third pairs of vertical supports.

4. The system of claim 1, wherein said peripheral wall system comprises a passage, said passage re-sealable by a fastener.

5. The system of claim 4 wherein said fastener comprises a zipper or a hook and loop system.

6. The system of claim 4 wherein said peripheral wall system further comprises a pair of orifices, said orifices passable by an air-pressured device.

7. The system of claim 6 wherein said air pressured device comprises a hose.

8. The system of claim 1 wherein a cutaway is placed at a bottom of a middle section of said front lining.

9. The system of claim 1 further comprising a fire-resistant material.

10. The system of claim 9 wherein said fire-resistant material comprises a PVC tarpaulin.

11. The system of claim 1 wherein said roof and said peripheral wall system comprise a translucent material.

12. The system of claim 1, wherein said air vents are substantially flush with said surface.

13. The system of claim 1, wherein said air vents capture particulates within the air and prevent said particulates from entering said interior space while air flows through said vents.

14. A method for applying a spray-on bed-liner to a truck having a truck cab and a truck bed, the method comprising the steps of
inflating a bed-liner booth, said bed-liner booth comprising
an inflatable frame having a first pair of inflatable vertical supports, a first inflatable overhead horizontal support connected to and extending between said first pair of vertical supports, a second pair of inflatable vertical supports, a second inflatable overhead horizontal support connected to and extending between said second pair of vertical supports;
a non-inflatable roof connected to the top of said inflatable frame;
a floor at the bottom of said inflatable frame;
a peripherally extending wall system connected to said vertical supports, said wall system including a front wall section extending between said first pair of vertical supports, wherein said inflatable frame, said roof, said floor, and said wall system define an interior space and an exterior space;
one or more air inlets to supply air to inflate said inflatable frame;

a plurality of air vents in a surface of said second overhead horizontal support, said air vents allowing air to pass from an inside of said inflatable frame to said interior space to create a positive pressure within said interior space as compared to said exterior space;
said front wall section comprising an entry port, wherein said entry port is operable to allow said truck bed to pass from said exterior space to said interior space, while said truck cab extends out into said exterior space; and
one or more exhaust panels placed in said peripherally extending wall system, each of said exhaust panels comprising a filter, said booth configured to drive air only by positive pressure through said exhaust panels;
pushing the air from said inflatable frame into said interior space through said air vents to create a positive pressure within said interior space;
receiving said truck bed within said entry port, while keeping at least a portion of said truck cab in said exterior space;
applying a truck bed-liner to said truck bed; and
driving the air that passes from the inside of said interior space to said exterior space through said exhaust panels by positive pressure only.

15. The method of claim 14 further comprising the step of placing a liner within said interior chamber.

16. The method of claim 14 further comprising the step of entering said bed-liner booth through a passage, further wherein said passage is placed on said peripherally extending wall system.

17. The method of claim 16 further comprising the step of inserting a hose within an orifice to supply an air-powered device.

18. The method of claim 14, wherein said air vents are substantially flush with said surface.

19. An inflatable bed-liner booth for applying a bed-liner to a truck having a truck cab and a truck bed, the booth comprising:
an inflatable frame comprising a first pair of inflatable vertical supports having upper and lower ends, a first inflatable overhead horizontal support connected to and extending between said upper ends of said first pair of inflatable vertical supports, a second pair of inflatable vertical supports having upper and lower ends, a second inflatable overhead horizontal support connected to and extending between said upper ends of said second pair of inflatable vertical supports, and an inflatable generally U-shaped inflatable base connected to said lower ends of said first and second pairs of inflatable vertical supports;
a non-inflatable roof connected to the top of said inflatable frame;
a floor at the bottom of said inflatable frame;
a peripherally extending wall system connected to said vertical supports, said wall system including a front wall section extending between said first pair of vertical supports, further wherein said inflatable frame, said roof, said floor, and said wall system define an interior space and an exterior space;
one or more air inlets to supply air to inflate said inflatable frame;
a plurality of horizontally facing air vents in a surface of said inflatable frame, said air vents allowing air to pass from an inside of said inflatable frame to said interior space to create a positive pressure within said interior space as compared to said exterior space;

an entry port placed on said front wall section, wherein said entry port comprises an opening and is operable to allow said truck bed to pass from said exterior space to said interior space such that said truck bed to be sprayed is enclosed in said booth, while said truck cab of said truck extends out in said exterior space; and one or more exhaust panels placed in said peripherally extending wall system, each of said exhaust panels comprising a filter, said booth configured to drive air only by positive pressure through said exhaust panels.

20. The booth of claim 19, wherein said air vents capture particulates within the air and prevent said particulates from entering said interior space while air flows through said vents.

\* \* \* \* \*